(12) United States Patent
Gotthard et al.

(10) Patent No.: US 7,478,552 B2
(45) Date of Patent: Jan. 20, 2009

(54) OPTICAL DETECTION ALIGNMENT/TRACKING METHOD AND APPARATUS

(75) Inventors: Doug Gotthard, Goleta, CA (US); Ben Ohler, Santa Barbara, CA (US)

(73) Assignee: Veeco Instruments Inc., Plainview, NY (US)

( * ) Notice: Subject to any disclaimer, the term of this patent is extended or adjusted under 35 U.S.C. 154(b) by 109 days.

(21) Appl. No.: 11/385,273

(22) Filed: Mar. 21, 2006

(65) Prior Publication Data

US 2007/0220958 A1 Sep. 27, 2007

(51) Int. Cl.
*G01B 5/28* (2006.01)
*G01N 13/10* (2006.01)

(52) U.S. Cl. ............... 73/105; 977/849; 977/850; 977/860; 977/863; 977/868

(58) Field of Classification Search ............... 73/105; 250/306, 307; 977/849–851, 860, 863, 868–870
See application file for complete search history.

(56) References Cited

U.S. PATENT DOCUMENTS

| | | | |
|---|---|---|---|
| 5,266,801 A | 11/1993 | Elings et al. | |
| RE34,489 E | 12/1993 | Hansma et al. | |
| 5,406,833 A * | 4/1995 | Yamamoto | 73/105 |
| 5,412,980 A | 5/1995 | Elings et al. | |
| 5,463,897 A | 11/1995 | Prater et al. | |
| 5,560,244 A | 10/1996 | Prater et al. | |
| 5,656,769 A * | 8/1997 | Nakano et al. | 73/105 |
| 5,714,682 A | 2/1998 | Prater et al. | |
| 6,021,665 A * | 2/2000 | Hayashi et al. | 73/105 |
| 6,032,518 A | 3/2000 | Prater et al. | |
| 6,998,602 B2 * | 2/2006 | Kamps | 250/234 |

* cited by examiner

*Primary Examiner*—Daniel S Larkin
(74) *Attorney, Agent, or Firm*—Boyle Fredrickson, S.C.

(57) ABSTRACT

A method of operating a probe based instrument includes a light source that generates and directs a beam of light towards a probe of the instrument to detect a property of probe deflection. The method automatically adjusts the position of the light beam on the probe based on movement of the probe by a Z actuator so as to eliminate apparent parasitic deflection of the probe. A light source assembly for detecting deflection of a probe preferably includes a base, a tip/tilt stage mounted on the base and a light source supported by the tip/tilt stage. The tip/tilt stage includes at least one electrically actuated fine adjustment actuator that controls the tip/tilt stage, preferably independently of movement of the AFM scanner used to move the probe.

21 Claims, 9 Drawing Sheets

OPTICAL DETECTION ALIGNMENT/TRACKING METHOD AND APPARATUS

BACKGROUND OF THE INVENTION

1. Field of the Invention

The present invention is directed to a method and apparatus for tracking the laser beam of an optical detection apparatus employed by a scanning probe microscope (SPM), and more particularly, to a tracking method and apparatus that enables top-down optical access to a probe of an atomic force microscope (AFM).

2. Description of Related Art

Several probe based instruments monitor the interaction between a cantilever-based probe and a sample to obtain information concerning one or more characteristics of the sample. Scanning probe microscopes (SPMs), such as the atomic force microscope (AFM), are devices which typically use a sharp tip of the probe to make a local measurement of one or more properties of a sample. More particularly, SPMs typically characterize the surfaces of small-scale sample features by monitoring the interaction between the sample and the tip of the associated probe. By providing relative scanning movement between the tip and the sample, surface characteristic data and other sample-dependent data can be acquired over a particular region of the sample, and a corresponding map of the sample can be generated.

In addition, especially when measuring biological samples, the user often wants to view the sample, simultaneously or otherwise. With many types of AFMs, however, using an optical microscope in conjunction therewith poses a challenge given space limitations in and around the probe and sample. These challenges are described further herein in connection with the discussion of known AFM technology.

The atomic force microscope is a very popular type of SPM. The probe of the typical AFM includes a very small cantilever which is fixed to a support at its base and has a sharp probe tip extending from the opposite, free end. The probe tip is brought very near to or into direct or intermittent contact with a surface of the sample to be examined, and the deflection of the cantilever in response to the probe tip's interaction with the sample is measured with an extremely sensitive deflection detector, often an optical lever system such as described in Hansma et al. U.S. Pat. No. RE 34,489, or some other deflection detector such as an arrangement of strain gauges, capacitance sensors, etc. AFMs can obtain resolution down to the atomic level on a wide variety of insulating or conductive surfaces in air, liquid or vacuum by using piezoelectric scanners, optical lever deflection detectors, and very small cantilevers. Because of their resolution and versatility, AFMs are important measurement devices in many diverse fields ranging from semiconductor manufacturing to biological research.

The probe may be scanned over a surface using a high-resolution three axis scanner acting on the sample support and/or the probe. The instrument is thus capable of creating relative motion between the probe and the sample while measuring the topography or some other property of the sample as described, for example, in Hansma et al. supra; Elings et al. U.S. Pat. No. 5,266,801; and Elings et al. U.S. Pat. No. 5,412,980.

AFMs can be designed to operate in a variety of modes, including contact mode and oscillating flexural mode. In an oscillation "flexural mode" of operation the cantilever oscillates generally about a fixed end. One popular flexural mode of operation is the so-called TappingMode™ AFM operation (TappingMode™ is a trademark of the present assignee). In a TappingMode™ AFM, the tip is oscillated flexurally at or near a resonant frequency of the cantilever of the probe. When the tip is in intermittent or proximate contact with the sample surface, the oscillation amplitude is determined by tip/surface interactions. Typically, amplitude, phase or frequency of this oscillation is kept constant during scanning using feedback signals, which are generated in response to tip-sample interaction, most often using an optical deflection detection scheme. These feedback signals are then collected, stored, and used as data to characterize the sample.

A typical AFM system is shown in FIG. 1. An AFM 10 employing a probe device 12 including a base (not shown) and a probe 14, the probe 14 having a cantilever 15 supported by the base and a tip 17 on the free end of cantilever 15. An actuator or drive 16 drives probe 14 during operation. For Tapping Mode™ operation, drive 16 is an oscillating drive that drives probe 14 at or near the probe's resonant frequency. Commonly, an electronic signal is applied from an AC signal source 18 under control of an AFM controller 20 to drive 16, thus operating to oscillate probe 14, preferably at a selected free oscillation amplitude $A_o$. Notably, $A_o$ can be varied over a broad range, e.g., from microns to nanometers, the latter being typically used for non-contact force measurements. As a practical matter, for low force interaction with the sample surface during imaging, $A_o$ should be as small as possible, but large enough to prevent tip 17 from sticking to the sample surface 22 due to van der Waals and/or adhesive forces, for example. Probe 14 can also be actuated toward and away from sample 22 using a suitable actuator or scanner 24 controlled via feedback by computer/controller 20. Notably, the oscillating drive 16 may be coupled to the scanner 24 and probe 14 but may be formed integrally with the cantilever 15 of probe 14 as part of a self-actuated cantilever/probe. Moreover, though actuator 24 is shown coupled to the probe, actuator 24 may be employed to move sample 22 in three orthogonal directions as an X-Y-Z actuator.

In operation, as the probe 14 is brought into contact with sample 22, sample characteristics can be monitored by detecting changes in a characteristic of the deflection oscillation of probe 14. In particular, a deflection detection apparatus 26 employs a laser to direct a beam towards the backside of probe 14 which is then reflected towards a detector, such as a four-quadrant photodetector. As the beam translates across the detector, appropriate signals are transmitted to controller 20 which processes the signals to determine changes in the deflection/oscillation of probe 14. Commonly, controller 20 generates control signals to maintain a constant force between the tip and sample, typically to maintain a setpoint characteristic of the deflection/oscillation of probe 14. For example, controller 20 is often used to maintain the oscillation amplitude at a setpoint value, $A_S$, to insure a generally constant force between the tip and sample. Alternatively, a setpoint phase or frequency may be used.

During imaging, the control signals maintain the constant force most often by moving either the cantilever or the sample with respect to the other. By monitoring changes of the cantilever deflection/oscillation as a function of position over the surface and generating appropriate control signals, a map of the surface can be created. In particular, the sample surface is mapped by reading the control signals output by controller 20, which indicate relative motion of the cantilever and sample needed to keep the cantilever deflection oscillation constant.

Notably, some AFMs scan the sample (for example, in an XY plane) under a fixed probe defining a stylus or tip and a cantilever. There is, however, significant interest in AFMs that scan the tip over a fixed sample, including in Z, as shown in FIG. 1. This construction has a number of advantages, including the ability to image large samples that are not easily scanned. Nevertheless, some previous instruments that scan the tip suffer from compromises that do not allow them to take full advantage of the capabilities of AFMs that scan the sample. For example, one such scanned-tip AFM uses a fixed laser to measure cantilever deflection and thus has a maximum scan size set by the diameter of the laser beam at the cantilever. If the cantilever is scanned a distance larger than the beam size, it will move out from under the beam, and it will no longer be possible to detect the cantilever motion. Another scanned-tip design, however, mounts the laser and probe on the same scanning unit, so that they move together, and thus does not have this problem.

If the probe moves independently of the laser beam used to measure deflection, as in FIG. 1, then the beam needs to track probe movement. One solution for tracking the beam of an optical detection system employed in a scanned-tip AFM includes using a light source and a scanned optical assembly that guides light emitted from the light source onto a point of the cantilever. A moving light beam is thus created which will automatically track the movement of the cantilever during scanning. See U.S. Pat. Nos. 6,032,518, 5,714,682, 5,560,244, and 5,463,897, owned by Veeco Instruments Inc. Overall, the system of these patents is quite effective at tracking the laser beam with motion of the lever.

Though avoiding the scan size issue to an extent, such systems have the disadvantage that the scanner may have to carry the weight of a laser, electronic leads to the laser, a focusing lens, and/or any other mechanism for fine tuning the laser position on the cantilever. All of these devices can reduce the mechanical resonant frequency of the scanner and transmit vibrations to the cantilever. Even if the mechanism does not move the laser along with the scanner, the system still requires an optical assembly that is attached to the scanning mechanism adding weight to the scanner leading to these performance issues (See FIG. 4A of the '518 patent, for example). Also, in the case of a tube scanner, attachment of a laser to the interior of a scanner can make its exchange difficult, for example, in the case of laser failure. In addition, in these systems, the laser beam, the cantilever and the tip move with respect to a fixed position sensitive detector. So, when the cantilever is scanned over the surface of the sample, the reflected laser beam will move with respect to the fixed position sensitive detector even in the absence of any actual deflection of the cantilever, for example, due to limitations associated with piezoelectric scanners (e.g., motion not being perfectly linear, etc.).

Moreover, substantial difficulties are often encountered when attempting to properly align static correction optics such as those used in AFMs. There is always a limit to how precise the optics can be aligned, and there is an inherent variability in performance from scanner to scanner.

Moreover, as noted previously, though an optical microscope may be employed together with the tracking mechanisms of these patents, separate structures such as mirrors are required to bring in light to illuminate the probe/sample for the optical microscope. Due to inherent inefficiencies and substantially poorer performance, complete top-down optical access to the lever for viewing the same along with the sample is preferred. Herein, top-down optical access refers to disposing an objective and a condenser along an axis in line with an axis orthogonal to the probe and sample surface. Notably, however, in known systems, at least a portion of deflection detection apparatus or the scanner is mounted overhead of the probe and thus top-down optical access is compromised. Moving these components away from the region directly overhead of the probe, though creating challenges concerning tracking the laser beam as discussed further below, was therefore desired.

In sum, the field of atomic force microscopy has been in need of a system that tracks the laser along with deflection of the probe by preferably decoupling the tracking mechanism, including the light source and associated optical components, from the scanning mechanism used to scan the probe. Moreover, a system that is able to provide complete top-down optical access was preferred.

SUMMARY OF THE INVENTION

The present invention is directed to a laser tracking mechanism that is decoupled from the scanning apparatus of the AFM. In particular, separate tracking actuators are used to adjust laser position by moving a laser stage without coupling any optical structure to the scanning mechanism used to scan the probe. The signals used to drive the actuators (e.g., piezoelectric actuators) can either be based on actual deflection of the lever, some function thereof, or in response to empirical data derived when calibrating the laser position of the AFM. As a result, independent tracking is provided that allows separate calibration of the tracking mechanism for individual AFMs, including individual probes.

The active tracking mechanism of the preferred embodiments, as opposed to the passive methods and apparatus of prior systems, controls laser movement electronically using, preferably, corresponding axis dedicated laser piezoelectric actuator(s), thus allowing more precise tracking of laser position with respect to the SPM probe. Moreover, as a result, laser motion can be precisely calibrated for each tip alignment and corresponding SPM scanner. In the end, apparent deflection in response to Z position movement of the probe is virtually eliminated.

Although control can be configured in several ways, even with simple linear calibration functions where the tracking of the laser is fixed at some ratio of the probe translation itself, the active tracking apparatus and methods of the preferred embodiments provide generally superior results to prior apparatus in decoupling apparent cantilever deflection from Z-axis probe movement due to separate control of the laser stage and/or of the associated optics of the deflection detection scheme, especially as applications requiring larger scan sizes are implemented by the operator.

According to a first aspect of the preferred embodiment, a method of operating a probe based instrument includes providing a light source that generates and directs a beam of light towards a probe of the instrument to detect probe deflection. The method operates to move, with a first actuator, the probe relative to a sample in a direction substantially orthogonal to a surface of the sample. Moreover, the method automatically adjusts, using a second actuator, a position of the light beam based on motion of the first actuator to substantially maintain the light beam impinging on the probe.

In a further aspect of this preferred embodiment, the adjusting step is used to track motion of the probe. Typically, the motion of the probe occurs during a scanning operation, where the scanning operation moves the probe in at least one of three orthogonal directions.

According to another aspect of this preferred embodiment, the adjusting step includes reducing an apparent parasitic deflection of the probe.

In a still further aspect of this preferred embodiment, the probe based instrument has an at least substantially unobstructed optical path having an axis that is at least substantially perpendicular to the sample and in which at least a portion of the probe is located.

In another aspect of this preferred embodiment, the unobstructed optical path is a cone that has a numerical aperture of at least 0.2.

According to yet another aspect of this preferred embodiment, the method further includes calibrating the adjusting step. The calibrating step includes measuring the apparent parasitic deflection of the probe at a probe position, and determining an adjustment to be used during the adjusting step based on the apparent parasitic deflection.

According to another aspect of this preferred embodiment, the probe is coupled to a piezoelectric stack actuator to move the probe to the probe position. Preferably, the actuator moves the probe substantially orthogonally to a surface of the sample, and the calibrating step is repeated for a plurality of probe positions throughout a range of the actuator.

In a further aspect of this preferred embodiment, the method includes comparing a signal indicative of the apparent parasitic deflection to a threshold, wherein the determining step includes incrementing at least one tracking parameter a set amount if the threshold is met.

According to an even further aspect of the preferred embodiment, the adjusting step includes actuating a tip/tilt stage preferably supporting the light source. The tip/tilt stage is coupled to the second actuator which includes at least one fine adjustment actuator that provides movement of the beam in a corresponding direction.

According to another aspect of this preferred embodiment, the fine adjustment actuator is a piezoelectric stack positioned in series with a manual coarse adjustment screw.

In a further preferred embodiment, a light source assembly for detecting deflection of a probe of a probe based instrument includes a light source that directs a beam of light towards the probe. The assembly also includes a first actuator to move the probe in a direction substantially orthogonal to the surface of a sample and a second actuator that substantially maintains the light beam impinging on the probe based on motion of the first actuator.

In a further aspect of this preferred embodiment, the light source assembly comprises a light source stage upon which the light source is mounted and a light source stage frame kinematically mounted to one another and biased with a spring.

According to another aspect of this preferred embodiment, the light source assembly includes a pivot for kinematically mounting the light source stage and the light source stage frame is positioned at about a center portion of the tracking mechanism, substantially in line with the beam of light output by the light source.

In a still further aspect of this preferred embodiment, the light source is mounted in a probe based instrument and the first actuator is a Z actuator having a range and wherein an amount to move the light beam is based on movement of the probe by the first actuator is calibrated to remove apparent parasitic deflection.

In a further preferred embodiment, a method of operating a probe based instrument includes providing a light source that generates and directs a beam of light towards a probe of the instrument to detect probe deflection. The method also includes positioning a probe relative to a sample with a first actuator, the first actuator moving the probe in a direction substantially orthogonal to a surface of a sample and based on motion of the first actuator, actively tracks the probe with the beam of light.

According to another preferred embodiment, a method of operating a probe based instrument includes providing a light source that generates and directs a beam of light towards a probe of the instrument to detect probe deflection and positioning, with a first actuator, a probe relative to a sample where the first actuator moves the probe in a direction substantially orthogonal to a surface of a sample. The method also includes actively tracking the probe with the beam of light based on motion of the first actuator.

According to another preferred embodiment, a light source assembly for detecting deflection of a probe includes a base, a tip/tilt stage mounted on the base and a light source supported by the tip/tilt stage. Preferably, the tip/tilt stage includes at least one electrically actuated actuator that controls the tip/tilt stage.

According to another aspect of this embodiment, the light source assembly is mounted in a probe based instrument having an at least substantially unobstructed optical path having an axis that is at least substantially perpendicular to a sample and in which at least a portion of the probe is located. The unobstructed optical path is preferably a cone with a numerical aperture of at least 0.2.

According to yet another aspect of this preferred embodiment, the tip/tilt stage includes a light source stage upon which the light source is mounted, and a light source stage frame. The light source stage and the light source stage frame are kinematically mounted to one another and are biased with a spring.

According to a further aspect of this embodiment, the pivot for kinematically mounting the light source stage and the light source stage frame is mounted on the light source stage frame. The actuator may be mounted on the light source stage.

According to another aspect of this preferred embodiment, the pivot for kinematically mounting the light source stage and the light source stage frame is positioned at about a center portion of the tip/tilt stage, substantially in line with the beam of light output by the light source and more preferably, off-center.

According to an even further aspect of this preferred embodiment, the actuator translates a light beam output by the light source independent of a probe actuator that translates a probe in a particular direction relative to a surface of the sample.

According to yet another aspect of this embodiment, the light source assembly is mounted in a probe based instrument that includes a probe actuator having a range. The probe actuator translates the probe substantially orthogonally relative to the sample support, and preferably an amount to move the light source in response to movement of the probe is calibrated to remove apparent parasitic deflection.

According to another aspect of this preferred embodiment, the amount to move the light source is determined for multiple corresponding probe positions. The probe positions do not include each probe position in the range of the actuator, and the amounts are used in a best-fit algorithm so as to calibrate laser movement for each probe position throughout the range of the actuator.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENT

The preferred embodiments facilitate the construction of AFMs having top-down optical access to the probe and sample, for biological applications, for example, by accommodating movement of all optical detection and tracking components away from the region above the probe. Moreover, the mechanism used to track the laser operates to translate the beam of the deflection system independent of operation of the AFM scanner. Therefore, the preferred embodiments avoid compromising AFM performance contrary to known systems in which, for example, the tracking lens is coupled to the scanner.

More particularly, the focused laser spot is tracked on the moving probe/tip through an independent and active piezoelectric actuator driven tracking mechanism. The tracking mechanism is active in that, during AFM operation, the mechanism continually determines probe position and, based on calibration data, moves the laser beam into optimum alignment with the probe.

To do so, the apparatus preferably includes one or more fine piezoelectric actuators (e.g., a piezo stack) in series with a manual laser stage adjustment screw typically used to provide coarse adjustment of the laser beam in a particular direction. Importantly, the fine adjustment laser stage piezo(s) is driven electronically with an independent voltage, the characteristics of which are described further below. For laser tracking applications, as contemplated by the present preferred embodiments, this feature allows for the tracking dynamics to be calibrated for optimal tip tracking performance.

Note that, although the actuators are described as being piezoelectric, the actuators may be any suitable actuator for this purpose, including electromagnetic, electrostatic, piezoresistive, etc. Moreover, although particularly useful for scanned probe (in Z) AFMs, the preferred embodiments are adaptable to any AFM to facilitate laser alignment and calibration, and to optimize laser position on the probe.

By adjusting the piezoelectric actuator voltage, fine laser position adjustments can be used to optimize the position of the laser spot on the probe. In this regard, active software controlled feedback based on the monitored laser power signal allows the system to achieve increased precision in the laser alignment, in a more efficient fashion. Moreover, the mechanism permits smaller, lighter scanners by removing a relatively large, heavy optical tracking component from scanned tip SPM scanners. Performance is correspondingly boosted. Of course, as noted above, the preferred embodiments are also useful for non-scanned probe SPM scanners for increased precision and improved ease-of-use in laser alignment.

Figure 1:
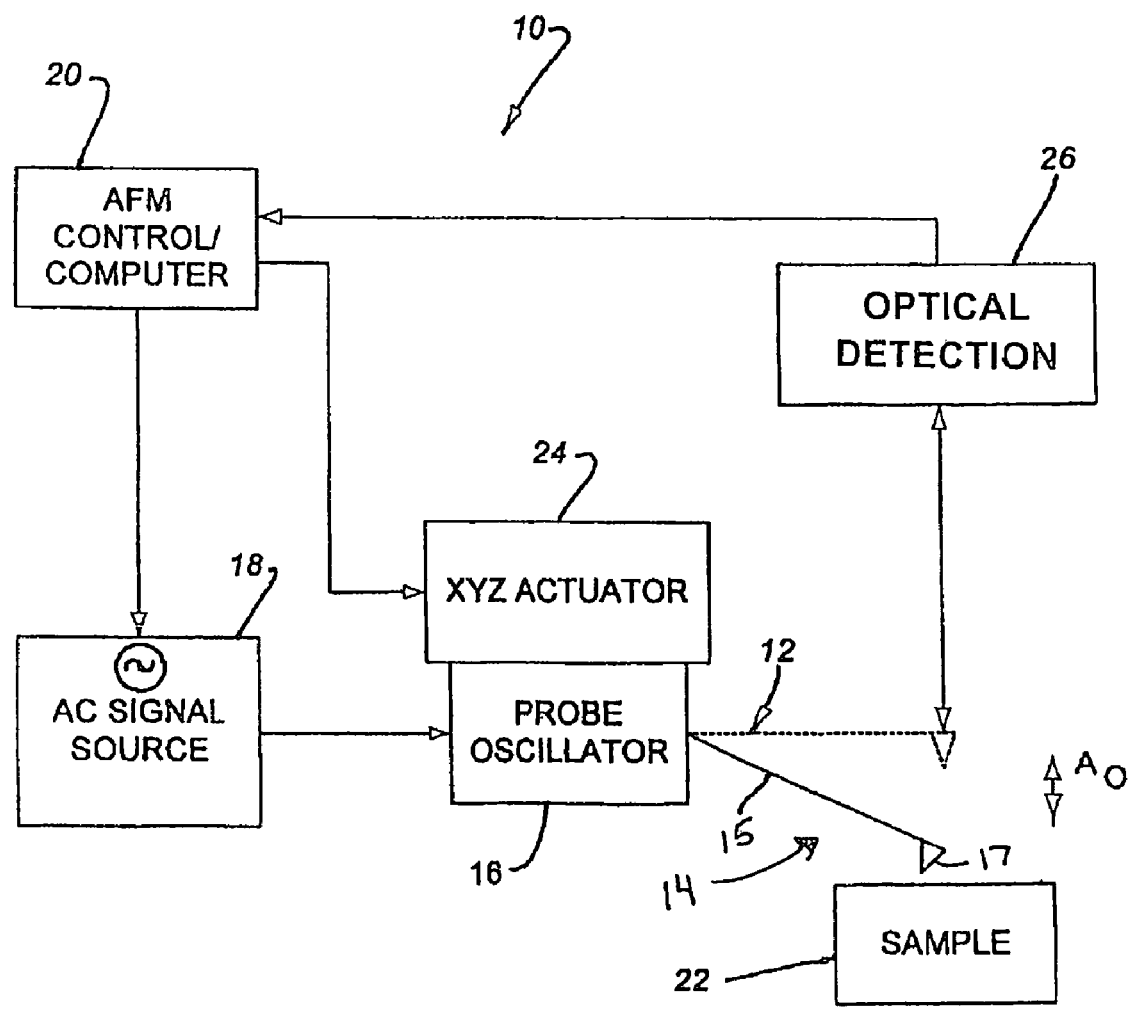
FIG. 1 is a schematic block diagram of a prior art atomic force microscope (AFM)
Figure 2:
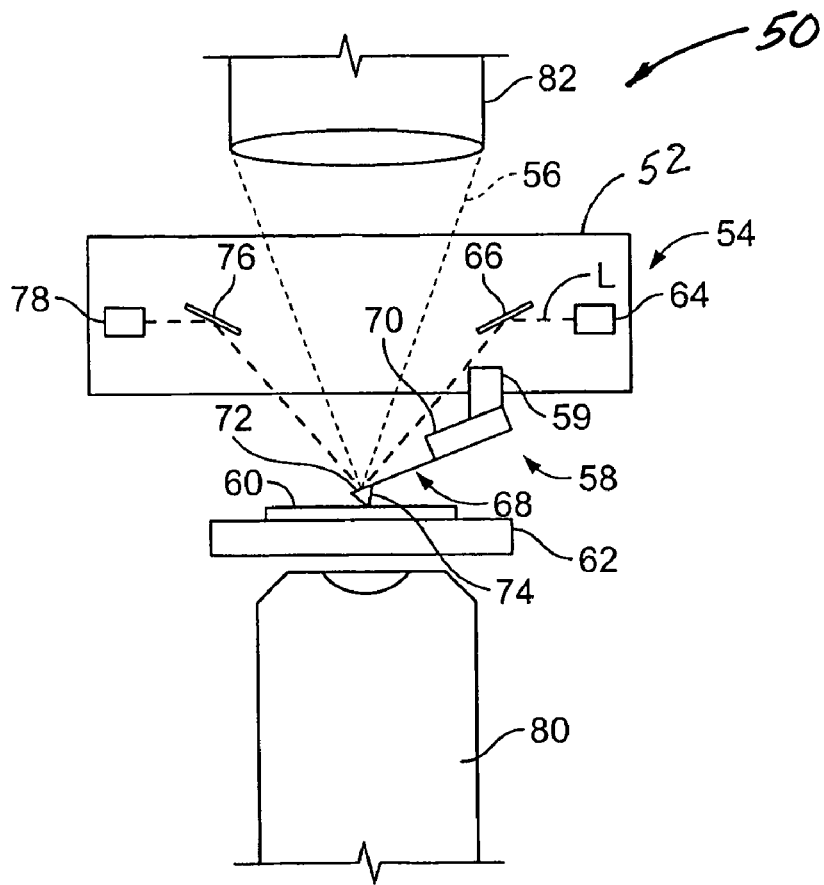
FIG. 2 is a schematic cross-sectional side view of an AFM of the preferred embodiment illustrating top-down optical access.
Figure 3:
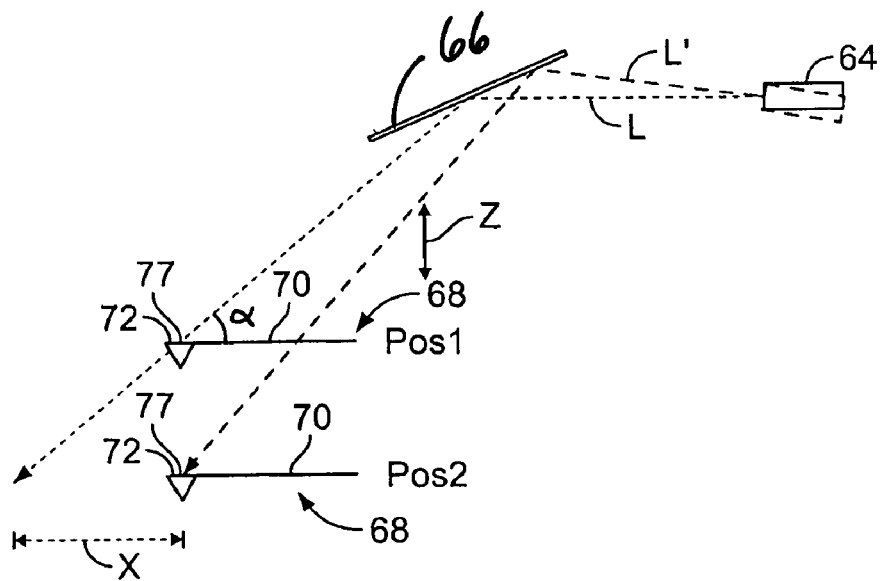
FIG. 3 is a schematic illustration of the need for tracking when bringing the laser beam of the deflection detection apparatus in from an angle other than directly overhead of the probe, as in FIG. 2.

Referring initially to FIGS. 2 and 3, an atomic force microscope (AFM) 50 having top-down optical access is shown, along with an illustration of the problem concerning tracking the laser beam when the laser is not directed toward the probe from directly overhead. The AFM includes a superstructure base or head 52 that supports components of an optical detection apparatus 54. The optical components are arranged so as not to impinge upon an exclusion region 56 defined overhead of a probe device 58, which is likewise mounted within the AFM superstructure 52. More particularly, probe 58 is preferably mounted on a scanner 59, such as a piezoelectric stack actuator, to actuate probe 58 in Z, for example, to engage probe 58 with a sample 60 and to move probe 58 in response to tip-sample interaction during AFM operation. In addition, sample 60 is mounted on a support 62, preferably including a stage that, for example, translates the sample in an XY plane for imaging different portions of the sample during data collection.

Deflection detection apparatus 54 includes a laser tracking mechanism 64 mounted in superstructure 52. Laser tracking mechanism 64 preferably houses a laser to direct a beam "L" generally parallel to a surface of the sample 60 towards a mirror 66. The mirror 66 is arranged to deflect the beam towards a backside 72 of a cantilever 70 of a probe 68 of probe device 58. Preferably, when aligned, the beam "L" is directed toward the probe 68 at about 45° to the surface of sample 62. The apparatus 54 is arranged so the beam then reflects off the backside 72 of probe 68 toward a second mirror 76 that directs the reflected beam towards a detector 78 of the optical deflection detection apparatus. As probe 68, including tip 74 scans sample 60 during operation, the reflected beam translates across detector 78 to provide an indication of one or more sample characteristics.

In this case, the arrangement of the detection apparatus 54 permits a microscope objective 80 to be mounted beneath sample 60 to provide a view of the imaging operation while a condenser 82 is mounted overhead. Again, keeping detection apparatus 54 and scanner 59 out of the exclusion region 56 provides space for these optical viewing components. This type of top-down optical access of the preferred embodiment is ideal for imaging a variety of types of samples, most notably biological samples.

More particularly, as highlighted previously, the components of the optical detection scheme of most AFMs typically reside in all or part of exclusion region 56. A challenge with the present design was to move the laser of the optical detection apparatus 54 outside exclusion region 56, yet provide a way to track a beam "L" without using conventional techniques, such as using a tracking lens coupled to the Z-scanner 59. As shown, this has been accomplished by moving the laser tracking mechanism 64 and detector 78 outside the exclusion region 56, while using mirrors 66, 76 to direct beam "L" appropriately toward probe 68. The problem that results is that beam "L" does not track probe 58 when probe 58 moves in Z during AFM operation as it does in a conventional AFM wherein the laser beam impinges the probe from overhead. This effect is illustrated in FIG. 3.

Turning to FIG. 3, a light beam "L" output by a laser of the mechanism 64 of optical deflection detection apparatus 54 is directed toward mirror 66 which deflects beam "L" towards the backside 72 of cantilever 70 of probe 68 at an angle α. As probe 68 translates vertically or in "Z" during an imaging operation, the incident beam is at risk of missing backside 72 of cantilever 70, or otherwise contacting cantilever 70 at a non-optimum position, thus interrupting the collection of data during operation. In particular, as probe 68 moves from position one "POS1" to position two "POS2" the beam "L" misses the point 77 (e.g., alignment position) on backside 72 of cantilever 70 that would reflect the beam towards detector 78 of optical detection scheme 54 by an amount "X." In this case in which the beam "L" is brought in to contact the cantilever's backside 72 at about 45°, "X" is substantially equal to the distance the probe travels in "Z." Therefore, to bring the beam "L" onto the backside of cantilever 70 in POS2, the beam needs to be moved (i.e., tracked) by some amount corresponding to the Z movement of the probe, as shown by the tilted tracking mechanism 64 and the corresponding beam "L'." The apparatus and algorithms of the present invention accomplish this goal.

Notably, exclusion region 56 of primary interest is a cone. More particularly, a cone having a corresponding numerical aperture (NA) of at least 0.2, more preferably at least 0.4, and even more preferably at least 0.6.

Figure 4:
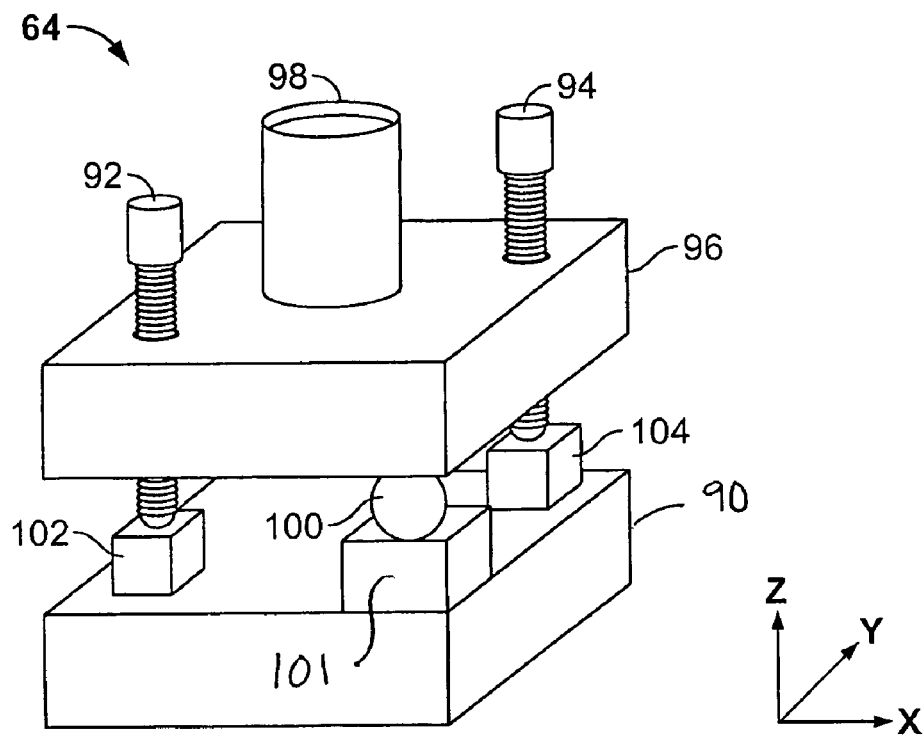
FIG. 4 is a schematic perspective view of a tracking mechanism of a preferred embodiment.

A schematic view of a conceptualized embodiment of laser tracking mechanism 64 housing the laser 98 of optical detection apparatus 54 is shown in FIG. 4. The laser 98 is mounted on a laser stage 96. Tracking mechanism 64 is a tip/tilt stage that includes a laser stage frame 90 that is mounted within the AFM base or head 52 (FIG. 2). Tracking mechanism 64, and in particular, laser stage frame 90, is designed to interface with coarse adjustment screws 92, 94 that are used upon initial set-up of the AFM to manually align and adjust the position of the laser beam generated by laser 98 onto the back of the cantilever of the probe. The adjustment screws 92, 94 are adapted to move the corresponding laser beam in "X" and "Y," respectively.

Laser stage 96 of tracking apparatus 64 accommodates laser 98 and adjustment screws 92, 94. Laser stage frame 90 includes a pivot 100, in this case a ball, mounted on a block 101 that provides a pivot point for kinematically mounting laser stage 96 to laser stage frame 90. Laser stage frame 90 also includes, preferably, a pair of fine adjustment actuators 102, 104 positioned so they interface with coarse adjustment screws 92, 94 mounted on laser stage 96. Preferably, fine adjustment actuators 102, 104 are placed in series with screws 92, 94 for similarly providing movement of laser 98 in "X" and "Y," respectively. Together with a biasing spring (not shown in FIG. 4), laser is mounted kinematically.

Coarse adjustment screws 92, 94 are most often used during AFM set-up to generally align the laser beam so the beam impinges upon the back of the cantilever, but may not be necessary in some applications as actuators 102, 104, in some cases, can provide sufficient range to align the beam with the cantilever backside. Also, actuators 102, 104 are preferably piezostack actuators capable of precise movement in the sub-nanometer range, but may be any suitable actuator that provides the required fine-adjustment performance including, for example, electromagnetic, electrostrictive and electrostatic actuators.

The primary purpose of actuators 102, 104 is to tilt the laser stage to translate the beam in corresponding X and Y directions. As noted, actuator 102 is an X-axis fine adjustment piezoelectric actuator and actuator 104 is a Y-axis fine adjustment piezoelectric actuator, each of which is responsive to control signals generated and applied as discussed further below to track the laser beam with the probe during AFM operation. As the piezoelectric actuators 102, 104 are activated, the stage tilts and the laser beam emitted by the laser translates in corresponding X and Y directions.

Figure 5A:
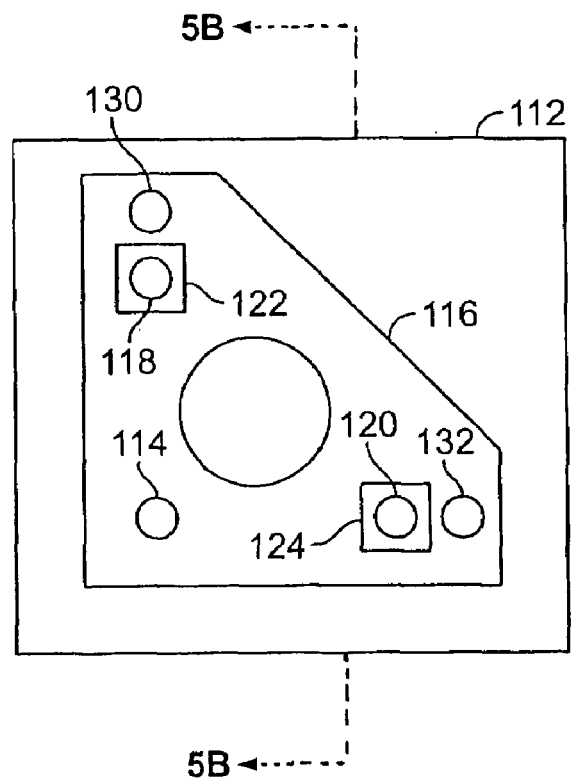
FIG. 5A is a schematic front view of a tracking mechanism of a preferred embodiment.
Figure 5B:
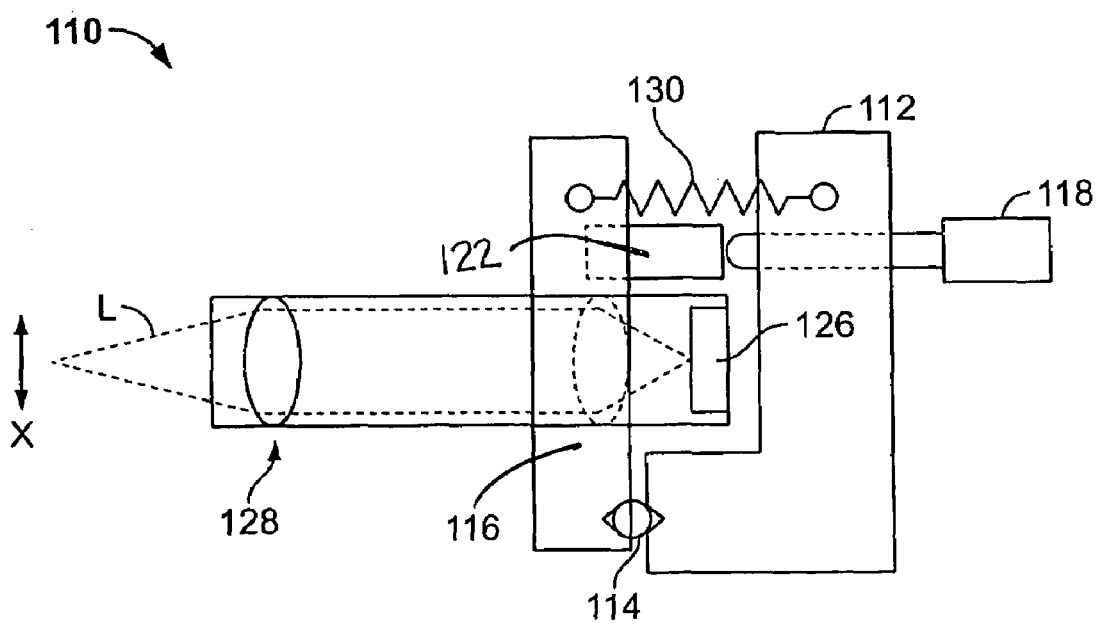
FIG. 5B is a schematic side view along lines 5B-5B of FIG. 5A.

A more detailed view of a preferred construction of the tracking mechanism 110 is illustrated in FIGS. 5A and 5B. The tracking mechanism 110 includes a generally L-shaped laser stage frame 112 and a laser stage 116. The laser stage frame 112 is supported by an AFM head (see, e.g., 52 in FIG. 2) having an outwardly extending portion including a laser stage pivot 114 that defines part of a kinematic mount between frame 112 and a laser stage 116 for translation of the laser beam in the X and Y directions.

Laser stage frame 112 includes coarse adjustment screws 118, 120 in series with fine adjustment piezoelectric actuators 122, 124 that are mounted on the laser stage 116. Laser stage 116 also supports a laser light source 126 (e.g., a laser diode, or the like), and appropriate optical components 128 for forming the laser beam, "L." Preferably, laser stage frame 112, and laser stage 116 are biased toward one another using return springs 130, 132, thus holding the fine adjustment piezo actuators 122, 124 (discussed below) in series with coarse adjustment screws 118, 120.

Laser stage 116 includes X and Y axis fine adjustment piezoelectric actuators 122, 124 that, as described in further detail below, track the laser beam with an AFM probe during set-up and operation so that the laser beam remains incident on the backside of the cantilever of the probe for optimum performance. With respect to FIGS. 5A and 5B, actuator 122 is, for the sake of convenience, the X-axis actuator, and actuator 124 is the Y-axis actuator for the coordinate systems illustrated. Of course tracking mechanism 110 can be constructed to track beam "L" in any of three orthogonal directions (X-Y-Z), oriented as desired.

In operation, most generally, appropriate signals are applied to the X-axis and Y-axis fine adjustment piezoelectric actuators 122, 124, respectively, to translate the angle α of the beam so that it continually impinges upon the backside of the cantilever, preferably at a specified location for optimum performance, so the reflected beam can be detected by the detector (78 in FIG. 2) optical detection apparatus. For instance, for the problem illustrated in FIG. 3, the X-axis fine adjustment piezoelectric actuator 122 of FIGS. 5A and 5B would be activated as the probe is moved in "Z" from POS1 to POS2. As a result, beam "L" would translate in "X" according to the coordinate system shown in FIG. 3 so it hits the backside 72 of probe 68.

Figure 6:
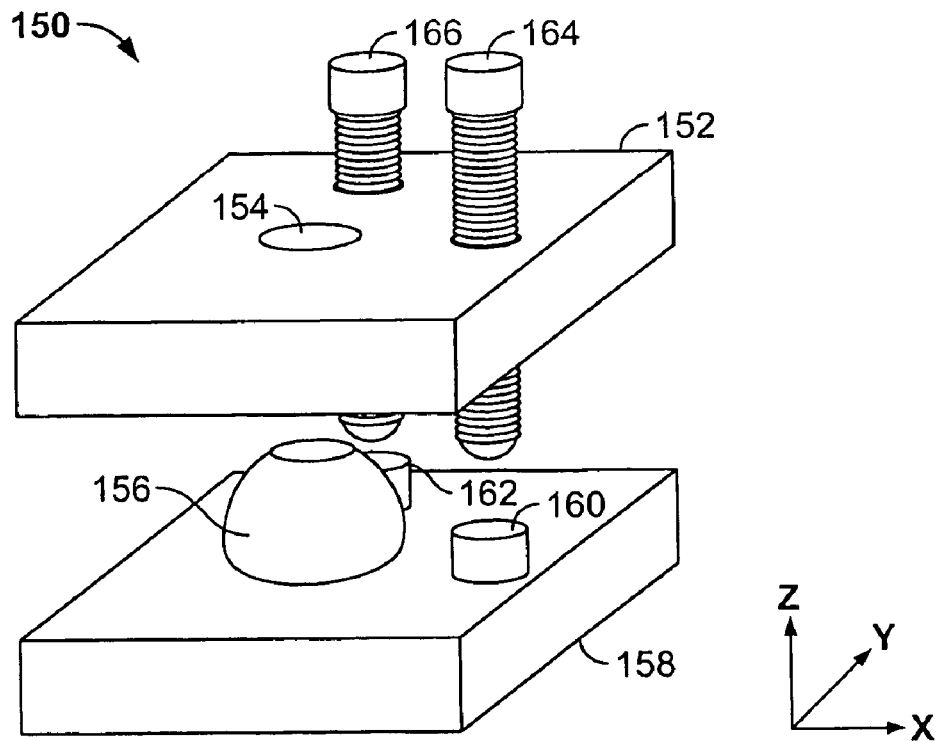
FIG. 6 is a schematic perspective view of an alternate embodiment of the tracking mechanism.

In FIG. 6, an alternative embodiment of the tracking mechanism is shown. Similar to tracking mechanism 64 shown in FIG. 4, a tracking mechanism 150 includes a laser stage 158 that is supported by a laser stage frame 152, stage 158 supporting a laser light source. However, in this case, rather than mounting the laser stage pivot and X and Y-axis fine adjustment piezoelectric actuators at the corners of the laser stage frame 152, a laser stage pivot 156 is mounted at a center region of a laser stage frame 152, and X and Y-axis fine piezoelectric actuators 160, 162 are mounted near mid-points of the sides of laser stage 158 so as to form a right triangle with pivot 156. Laser stage frame 152 mounts in the AFM base of superstructure which preferably is embedded in pivot 156 (not shown). An aperture 154 is provided to accommodate the laser beam output by the laser mounted in pivot 156. Coarse adjustment screws 164, 166 are used for manually translating the laser beam in X and Y, respectively, during, for example, initial setup. Again, how the actuators 160, 162 are controlled is described in further detail below.

Figure 7A:
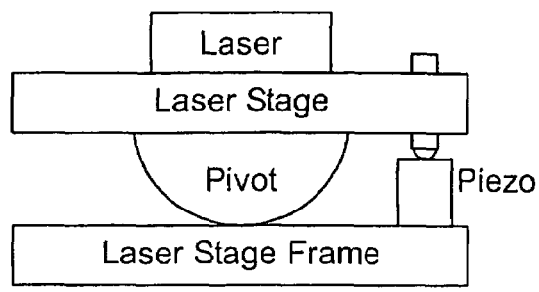
FIGS. 7A-7F are schematic side views of alternate embodiments of the apparatus preferred tracking mechanism.
Figure 7B:
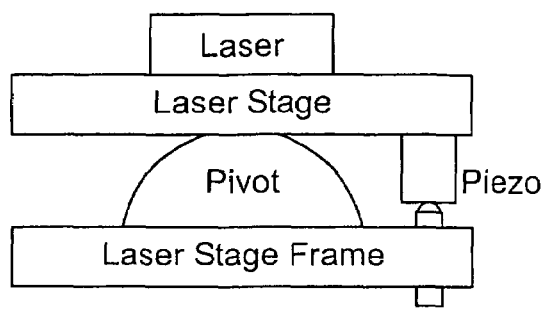
Figure 7C:
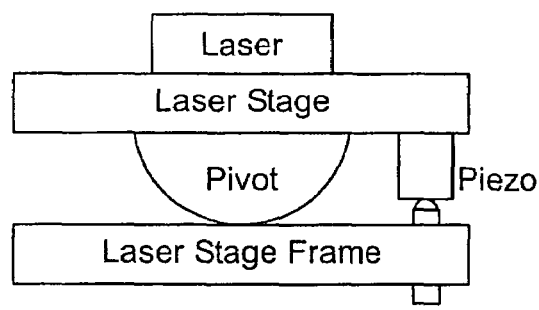
Figure 7D:
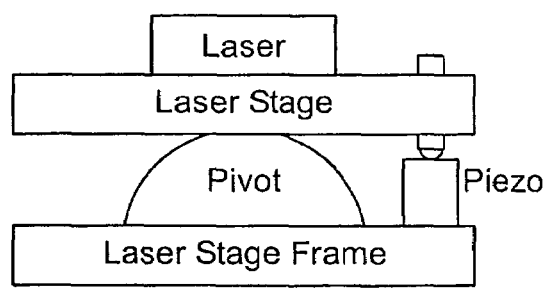
Figure 7E:
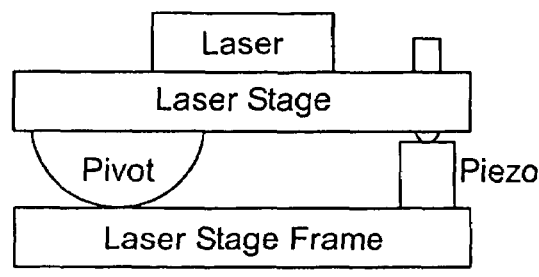
Figure 7F:
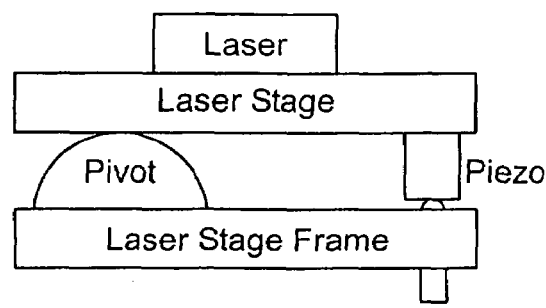

Turning to FIGS. 7A-7F, alternative embodiments of the tracking mechanism design are illustrated. Notably the fine piezoelectric actuators can be mounted on a laser stage frame (FIGS. 7A, 7D, 7E) or on a laser stage (FIGS. 7B, 7C, 7F). Moreover, though the laser is mounted on the laser stage in each case, the pivot may be mounted either on the laser stage (FIGS. 7A, 7C, 7E) or on a laser stage frame (FIGS. 7B, 7D, 7F). Moreover, the pivot point for the kinematic mount arrangement may be disposed near the center of the laser stage and laser stage frame (FIGS. 7A-7D), or near an edge of the tracking mechanism (FIGS. 7E and 7F) to provide larger range. Similarly, as briefly noted above, the coarse adjustment screws (not shown), if included, may be mounted on either the laser stage frame or the laser stage itself depending upon design requirements.

Active Control of Tracking Mechanism

Figure 8:
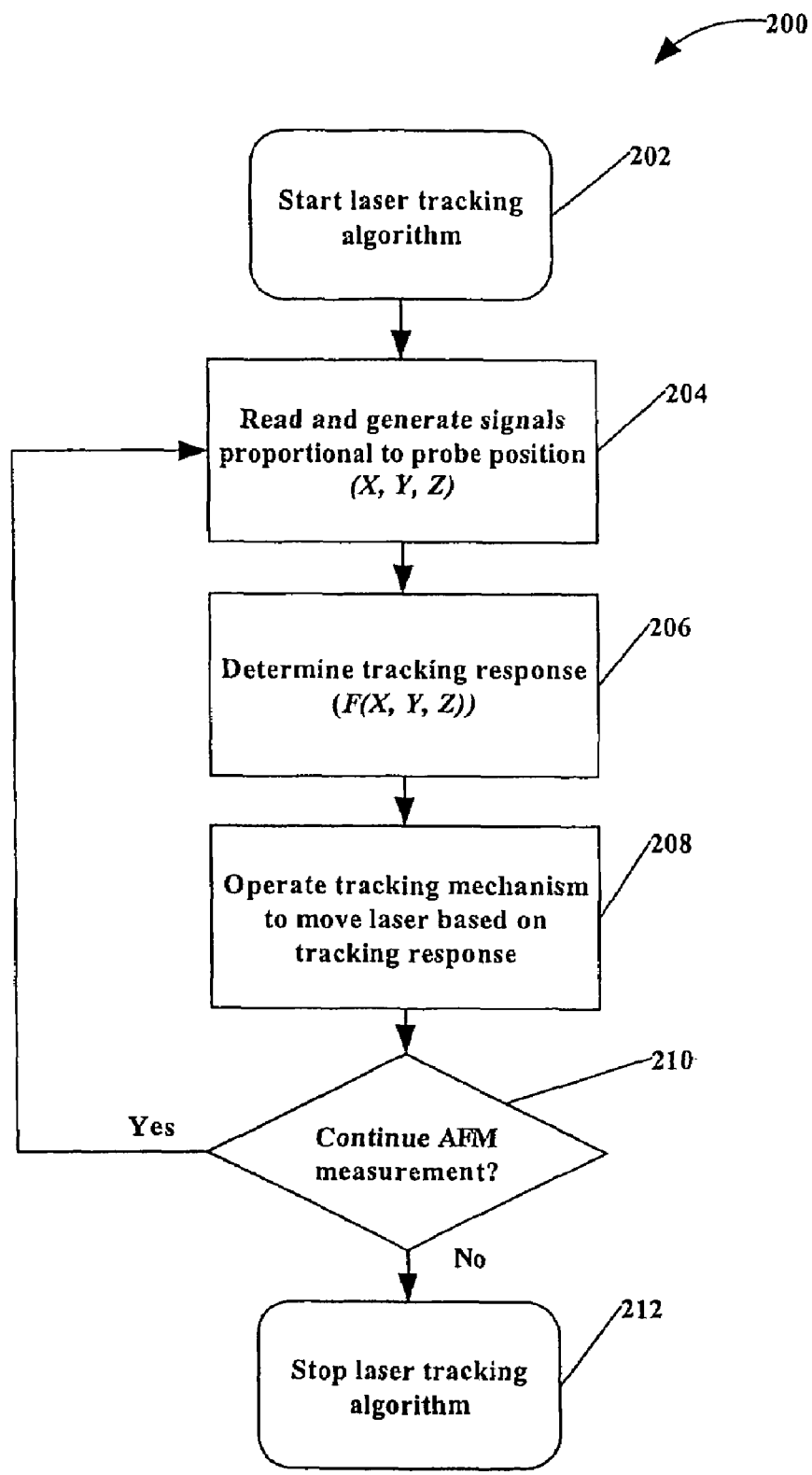
FIG. 8 is a flow chart illustrating operation of a tracking algorithm according to a preferred embodiment of the present invention.
Figure 9:
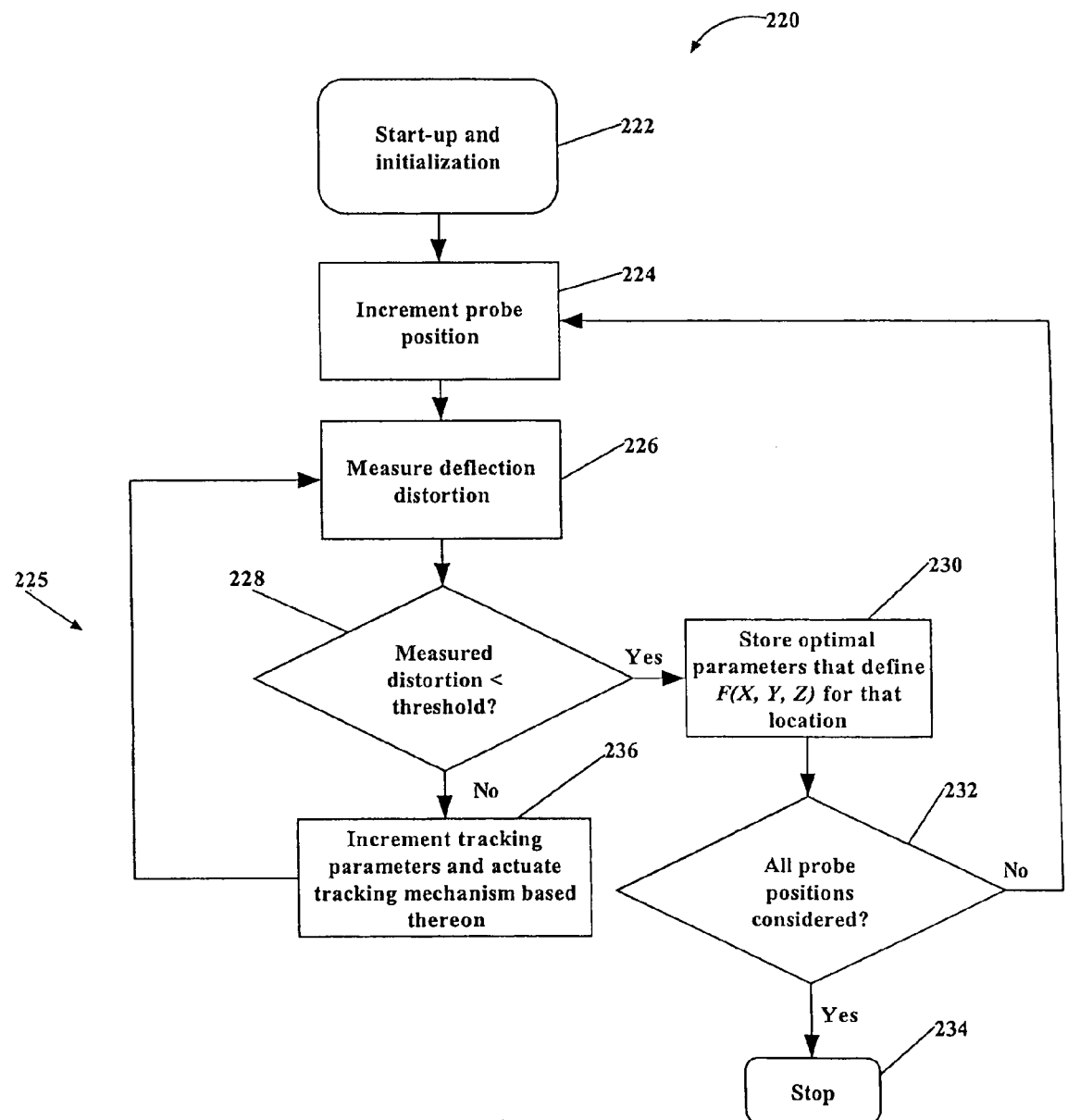
FIG. 9 is a flow chart illustrating a tracking optimization algorithm according to a preferred embodiment.
Figure 10:
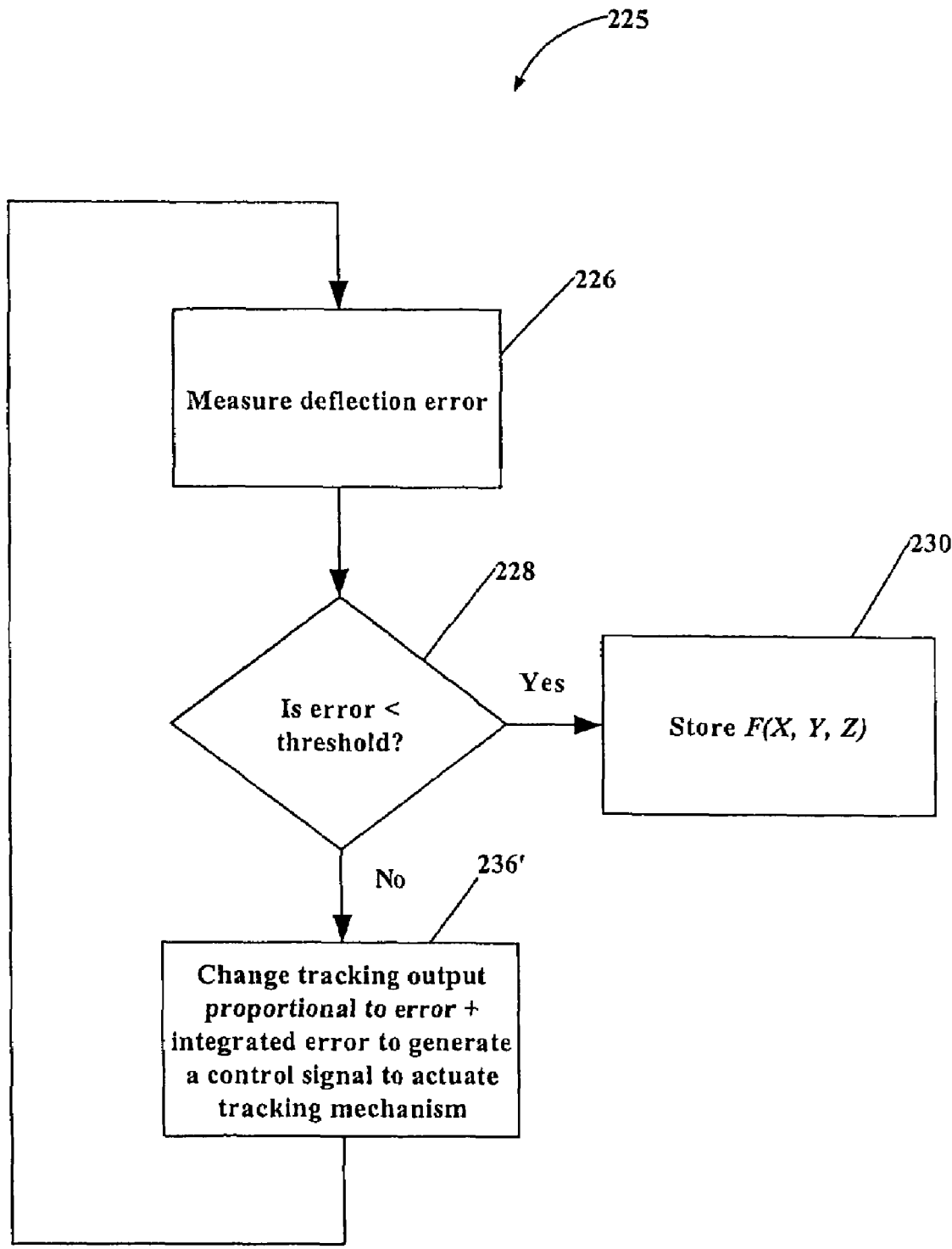
FIG. 10 is a flow chart illustrating tracking optimization using a feedback control algorithm.

Turning to FIGS. 8-10, operation of the tracking mechanism is described. Several methods are available to control the present laser tracking apparatus during AFM operation, each of which are described generally below. Unlike prior systems, which involved passively scanning all or part of the laser diode and associated optics with the same piezoelectric actuator used to scan the SPM probe, the current algorithms separately drive the tracking mechanism by actively applying appropriate control signals to independent axis-specific fine adjustment actuators, which may be disposed in series with coarse manual adjustment screws, based on probe position. This motion provided by the actuators is coupled to the deflection detection laser beam to insure that the laser beam impinges upon the backside of the probe cantilever. In general, the algorithms operate to minimize distortion of the probe deflection signals acquired by the optical lever-based deflection detection apparatus, such as that schematically illustrated in FIG. 3. Notably, motion of the SPM probe during SPM operation causes distortion in the present AFM design because the light source of the detection scheme is positioned outwardly of the exclusion region above the probe, and is directed toward the probe at an angle using a reflective surface such as a mirror, as described above. The preferred embodiments operate to track the laser on the probe to minimize these distortions. Although motion in "Z" is described specifically, the preferred embodiments may be used to track the laser with probe movement in any direction.

With respect to the specific control algorithms, a brief overview of the preferred embodiments is in order. Preferably, the movement of the laser stage is scaled according to optimized calibration parameters generated according to one of several alternate schemes discussed below. In one preferred embodiment, tracking of the laser can be fixed at some ratio of the probe translation itself. More particularly, the present active tracking device can be controlled by scaling the tracking signal linearly proportional to the tip/scan voltages used to maintain a set point characteristic of probe deflection/ oscillation during AFM operation. Alternatively, in this regard, signals proportional to tip position may be used, for example, when using separate displacement sensors, for example, capacitive, strain gauge, optical, etc., that detect actual changes in probe/tip position. By actively driving separate fine adjustment actuators for adjusting the laser, these methods are more effective than prior methods because the tracking ratio can be adjusted to optimize alignment for each probe and laser alignment.

Alternatively, a more advanced control algorithm may be employed to accommodate correcting for changes in probe position due to changing the incident (or reflected) angle of the laser. In this case, a trigonometric model is used to calculate the necessary tracking correction. Such a model can be used to better optimize the non-linear tracking response of the AFM.

According to a still further alternative, it is acknowledged that calculating the optimal tracking response based on a model can be difficult and developing the model is computationally intensive. As a result, a control algorithm that yields an optimal tracking response by using a "learning" approach has been devised. More particularly, prior to AFM data acquisition, an optimal tracking response is learned as the probe is moved throughout its range of motion so as to determine the corresponding additional contribution to the deflection signal. This embodiment can correct distortions regardless of their cause and thus is free of assumptions and models concerning the origin of deflection distortions, which may be many and thus difficult to pinpoint. As a result, the present calibration procedure that maps the optimal tracking response can be readily repeated each time the SPM probe is replaced when the laser alignment is changed.

More specifically, according to a first algorithm, tracking motion of the laser can be controlled using signals indicative of a linear function proportional to probe position. These signals may be the control signals used to move the probe during AFM operation, or signals proportional thereto using separate sensors that detect probe position.

In operation, as the probe moves in a certain direction, for example, down or in "Z," orthogonal to the sample, the laser stage should likewise track down by a set amount, typically scaled to the probe motion so the beam hits the same aligned point on the backside of the lever. Though useful over known systems given that the position of the beam is controlled separately from the scanner, ideal tracking of the laser is typically not a linear function of probe position. In particular, the response of both the probe (deflection distortions including additional contributions to the deflection signal upon movement of the probe) and the tracking actuators to the control signals is typically non-linear. Rather, the problem of the laser beam not tracking the probe is most generally trigonometric such that angular corrections based on linear motions are required. For example, as is the case for the AFM shown in FIG. 2, the probe and optical lever deflection detection apparatus coordinate systems may not be orthogonal to one another, thus complicating tracking the laser with the probe.

As a result, a second more analytical approach may be used. More particularly, the goal of such a model is to change the incident, or reflected, angle of the laser so as to develop a trigonometric model that outputs a necessary tracking correction. Calibrating optimum tracking parameters is therefore significantly more involved. Preferably, the geometry of laser tracking motion and cantilever motion is characterized using transfer function inversion (TFI). The non-linearity is measured and the inverse function is applied to develop the tracking parameters. As appreciated in the art, the task of developing such a trigonometric model is a highly computationally intensive analytic correction, particularly when considering that probe motion occurs in more than one axis. Because trigonometric functions are typically very inefficient computationally, system requirements are significant and performance can be compromised. Moreover, the problems associated with the non-linear response of both probe motion and the tracking actuators, as well as the imperfect orthogonality of the probe in the optical lever deflection detection coordinate systems still exist.

Therefore, a third algorithm is particularly useful. In this preferred algorithm, machine learning based control dependent substantially on actual probe position overcomes the complexity limitations of the model-based control system. In particular, the dependence of the tracking correction on probe position is developed by "learning" the optimal response rather than predicting or calculating the optimal response. In this case, undesired contributions to the deflection signal can be observed by examining the deflection signal during probe motion without tip-sample interaction. In this case, a "lookup table" or search algorithm can be developed in which the optimal tracking correction can be tabulated as a function of probe position. Thereafter, the data can either be used directly or reduced to a mathematical model using, for example, a best-fit approach. In an alternative, the history of the probe motion and tracking correction, as opposed to only the current probe position, can be used to provide the basis for developing tracking parameters in real time during AFM operation.

With this machine learning approach, the quality of the correction is only limited by the resolution of the dataset developed during the "learning" process, and the repeatability of the probe position data and tracking correction. In the end, such real time control typically involves less control overhead than, for example, the aforementioned model-based approach.

In operation, a signal or signals proportional to probe motion are applied to the individual axis specific piezoelectric actuators (see, for example, FIGS. 4-7). Typically, the signals may either be low or high level voltage signals (low level typically being ±15V, while high level signals are typically ±220V (piezo tube drive) or −20 to 150V (piezo stack drive)), that drive the piezoelectric actuators themselves or they may be outputs from displacement sensors that monitor actual probe and/or actuator motion. Notably, digital signals related to any of these analog signals may be used with appropriate supporting control circuitry, alternatively or in combination therewith. Also, though described in connection with driving the tracking mechanism hardware of the preferred embodiments, the present algorithms have broad application in the AFM art beyond the preferred tracking hardware described herein.

The "machine learning" laser tracking control algorithm of this preferred embodiment operates in two modes. In an optimization mode, an optimal set of parameters for controlling the position of the laser is determined. These parameters, when combined with signals indicative of probe motion, operate to minimize undesired distortions of the deflection signal over the range of motion of the probe. In the optimization mode, deflection distortion is measured for at least several locations over the range of motion of the probe using the optical deflection detection apparatus. Here, distortion is defined as a change of the deflection signal caused by anything other than an actual change in probe deflection. At each selected location, tracking parameters are incremented, or otherwise adjusted, so as to manipulate the laser beam (laser stage) to cause the beam to contact the probe at an optimum alignment location such that the deflection value does not change or changes by less than some pre-determined threshold. A "lookup table," including the adjustment parameters corresponding to probe positions, may then be developed and stored for use during AFM operation. There are at least two ways to develop the tracking parameters discussed in further detail below in connection with FIGS. 10 and 11. Moreover, data corresponding to each probe location in corresponding to the range of the Z scanner need not be developed; rather tracking parameters of periodic or selected points may be developed and parameters for other position be interpolated, etc.

In the second mode, known as the operating mode, the optimal parameter set is employed by the AFM to track the laser position, preferably using the preferred embodiments of the tracking mechanism of the preferred embodiment. As a result, the laser tracks the probe notwithstanding distortions in the deflection signal, and without compromising AFM performance.

Turning initially to FIG. 8, the Operating Mode of a preferred tracking algorithm 200 is shown. In the operating mode, algorithm 200 includes a start-up and initialization step in Block 202 to begin the laser tracking algorithm. Thereafter, in Block 204, signals are read that are indicative of probe position. These signals may be voltage signals used to drive, for example, the motion of the probe, or they may be separate sensor signals obtained from sensors included to directly measure probe movement, as stated earlier. Once probe position is substantially known, the tracking response, $F(X, Y, Z)$, is determined, for example, by interpolating and/or reading the control parameters corresponding to that probe position from a table developed during the Optimization Mode (see FIGS. 10-12) in Block 206. The output is then directed to a tracking mechanism (see, e.g., FIGS. 4-7) to move the laser so that the laser tracks the probe during AFM operation in Block 208. Specifically, at least one of the fine adjustment piezoelectric actuators are energized according to the determined tracking response. Thereafter, algorithm 200 determines whether the laser tracking algorithm should be continued in Block 210; for example, the algorithm may ask whether sample scan is complete. If not, control is returned to Block 204 as AFM operation continues, collecting and analyzing signals proportional to probe position. Once the AFM scan is complete, laser tracking algorithm 200 is stopped in Block 212.

Turning to FIG. 9, the Optimization Mode algorithm 220 used to calibrate the deflection detection apparatus and develop a set of tracking parameters is shown. Initially, at Block 222, the algorithm executes a start-up and an initialization routine. Notably, as part of this routine, optimum initial laser/probe alignment is preferably determined. More particularly, initial alignment is made such that the light reflecting from the probe is maximized. The photodetector is then positioned so that the reflected beam hits it within its active area. In Block 224, the tracking algorithm 200 corresponding to Operating Mode (FIG. 8) is started to move probe to a first position (preferably selected by the user). In this Optimization Mode, a continuous ramp or a set of discrete steps may be used to move the probe over its range of motion. The deflection distortion at that location is then measured in Block 226. Again, distortion is a change in deflection signal from its value at the initial position. Since this optimization step is performed while the probe is far from the sample, any change in deflection signal from its initial value will not be caused by a real change in probe deflection and it is therefore undesirable. Thereafter, the distortion is compared, for example, to a pre-determined threshold to determine whether the distortion is less than the threshold, in Block 228. For instance, user may wish to limit the deflection distortion below 5 nm over the full Z range. Based on a typical deflection sensitivity of 60 nm/V, this would require the deflection distortion to be less than 83 mV over the full range. If so, in Block 230, the optimal parameters associated with positioning the laser when the probe is at that position are stored as F(X,Y, Z). Thereafter, in Block 232, the algorithm determines whether all points corresponding to at least several probe positions (preferably, throughout the range of motion of the probe) have been analyzed. If so, the optimization mode is complete and the corresponding algorithm can be stopped in Block 234. If not, probe position is incremented and control is returned to Block 224 to develop tracking parameters for the next probe location.

Returning to Block 228, if the distortion is not less than the threshold, the tracking parameters associated with moving the laser are incremented in Block 236 to move the laser with the fine adjustment piezoelectric actuators. Preferably, the parameters are incremented to actuate the tracking mechanism according to one of the two methods illustrated in FIGS. 10 and 11. At this point, control is returned to Block 226 where the deflection distortion is again measured. The process 220 is continued until tracking parameters associated with each probe location have been developed.

Turning to FIG. 10, an algorithm or a machine learning-based optimization of laser tracking control parameters, using feedback optimization, is illustrated. The algorithm 225 generally corresponds to Blocks 226, 228, 230 and 236 of FIG. 9, and illustrates generating optimum parameters for tracking the laser at a particular probe location. More particularly, deflection error/distortion is measured in Block 226. That error has been compared to a threshold in Block 228. If it is less than the threshold, then the tracking parameters for optimum laser positioning at this probe location are stored in Block 230 for use in the preferred tracking algorithm 200, illustrated in FIG. 8. If not, feedback control is implemented in Block 236' to change the tracking output in an attempt to minimize the measured error. Preferably, this is accomplished by changing the tracking output proportional to the error, and integrating the error (PI loop) in Block 236'. The control signal or tracking output is applied to the tracking mechanism such as one of the tracking mechanisms illustrated in FIGS. 4-7 (e.g., to actuate the fine adjustment piezoelectric actuator (s), FIGS. 4-7), and control is returned to Block 226 to again measure the deflection error. This loop is continued until the error is less than the threshold at which point the tracking parameters associated with that probe position are stored (e.g., in a lookup table) in Block 230 for retrieval during the Operational Mode of the tracking algorithm 200.

Figure 11:
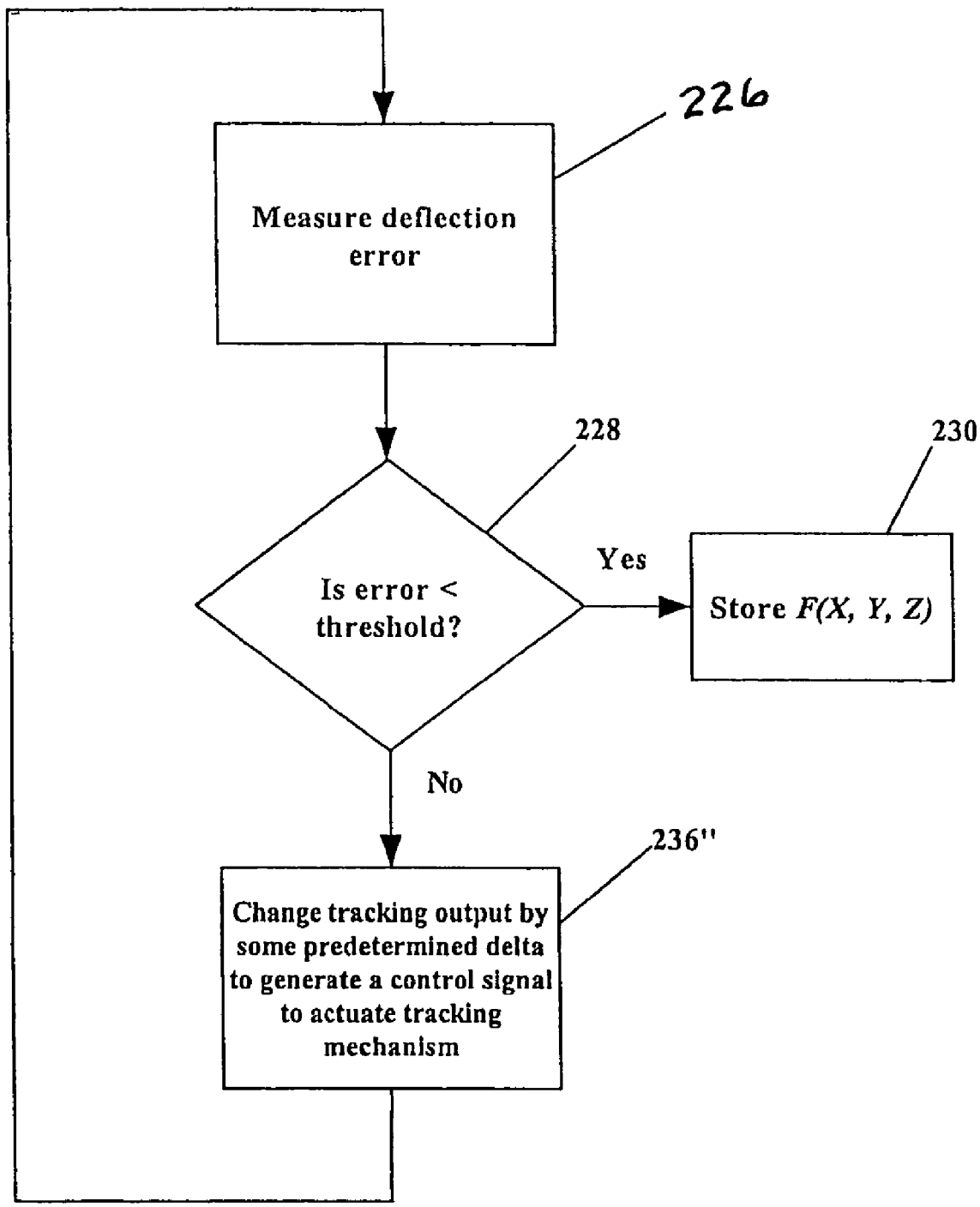
FIG. 11 is a flow chart illustrating tracking optimization using a search algorithm.

Though this feedback optimization method of generating a lookup table for use during the operational mode is preferred, an alternative algorithm is illustrated in FIG. 11. In FIG. 11, algorithm Blocks 226, 228 and 230 are the same as the feedback optimization algorithm illustrated in FIG. 10. However, in the case that the measurement deflection error is not less than the predetermined threshold, the algorithm executes Block 236". In Block 236", rather than changing tracking output based on the measured deflection error, the tracking output is changed by incrementing the tracking parameters by some predetermined delta (Δ) generally unrelated to the amount of distortion, and then control is returned to Block 226 to again measure the deflection error. Incremented tracking parameters are analyzed until the deflection error is minimized to a point such that the error is less than the threshold. At that point, the optimization parameters are still in Block 230. This type of searching algorithm is not as efficient as the feedback optimization algorithm illustrated in FIG. 10 given that feedback optimization attempts to provide the correct tracking parameters based on the measured distortion, and therefore is not as preferred.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

What is claimed is:

1. A method of operating a probe based instrument includes:
   providing a light source that generates and directs a beam of light towards a probe of the instrument to detect probe deflection;
   moving, with a first actuator, the probe relative to a sample in a direction substantially orthogonal to a surface of the sample;
   automatically adjusting, using a second actuator, a position of the light beam based on motion of the first actuator to substantially maintain the light beam impinging on the probe;
   wherein said adjusting step is used to track motion of the probe; and
   wherein the probe based instrument has an at least substantially unobstructed optical path for viewing the probe having an axis that is at least substantially perpendicular to the surface and in which at least a portion of the probe is located.

2. The method of claim 1, wherein the unobstructed optical path is a cone.

3. The method of claim 2, wherein the cone has a numerical aperture of at least 0.2.

4. The method of claim 3, wherein the cone has a numerical aperture of at least 0.4.

5. The method of claim 4, wherein the cone has a numerical aperture of at least 0.6.

6. The method of claim 1, wherein the light beam is output by the light source along a path that is not substantially orthogonal to the surface.

7. A method of operation a robe based instrument includes:
   providing a light source that generates and directs a beam of light towards a probe of the instrument to detect probe deflection;
   moving, with a first actuator, the probe relative to a sample in a direction substantially orthogonal to a surface of the samples; and
   automatically adjusting, using a second actuator, a position of the light beam based on motion of the first actuator to substantially maintain the light beam impinging on the probe;
   calibrating said adjusting step;
   wherein said adjusting step reduces apparent parasitic deflection of the probe; and
   wherein said calibrating step includes measuring apparent parasitic deflection of the probe at a probe position, and determining an adjustment to be used during said adjusting step based on the apparent parasitic deflection.

8. The method of claim 7, wherein said adjusting step is used to track motion of the probe.

9. The method of claim 8, wherein motion of the probe occurs during a scanning operation.

10. The method of claim 9, wherein the scanning operation moves the probe in at least one of three orthogonal directions.

11. The method of claim 7, further comprising repeating said calibrating step for a plurality of probe positions throughout a range of the first actuator.

12. The method of claim 7, further comprising comparing a signal indicative of the apparent parasitic deflection to a threshold; and
   wherein said determining step includes incrementing at least one tracking parameter a set amount if the threshold is met.

13. The method of claim 7, further comprising comparing a signal indicative of the apparent parasitic deflection to a threshold; and
   wherein said determining step includes using a feedback control loop to generate a signal that controls said actuating step a computed amount if the threshold is met.

14. The method of claim 13, wherein the feedback control loop is implemented with a P1 controller.

15. The method of claim 7, wherein said adjusting step is used to align the light beam with the probe.

16. The method of claim 7, wherein said adjusting step includes actuating a tip/tilt stage.

17. The method of claim 16, wherein the tip/tilt stage moves the light beam substantially independently of movement of the first actuator.

18. The method of claim 7, wherein the first and second actuators each are one of a group consisting of: a piezoelectric actuator, an electromagnetic actuator, an electrostrictive actuator, and an electrostatic actuator.

19. A method of operating a probe based instrument includes:
   providing a light source that generates and directs a beam of light towards a probe of the instrument to detect probe deflection;
   moving, with a first actuator, the probe relative to a sample in a direction substantially orthogonal to a surface of the sample;
   automatically adjusting, using a second actuator, a position of the light beam based on motion of the first actuator to substantially maintain the light beam impinging on the probe;
   wherein said adjusting step includes actuating a tip/tilt stage; and
   wherein the second actuator is coupled to the tip/tilt stage and includes at least one fine adjustment actuator that moves the beam in a corresponding direction.

20. The method of claim 19, wherein the fine adjustment actuator is positioned in series with a manual coarse adjustment screw.

21. The method of claim 19, wherein the tip/tilt stage supports the light source.

* * * * *

UNITED STATES PATENT AND TRADEMARK OFFICE
CERTIFICATE OF CORRECTION

PATENT NO.       : 7,478,552 B2                                          Page 1 of 1
APPLICATION NO.  : 11/385273
DATED            : January 20, 2009
INVENTOR(S)      : Gotthard et al.

It is certified that error appears in the above-identified patent and that said Letters Patent is hereby corrected as shown below:

Claim 7; line 43: Please delete "robe" and replace it with --probe--
Claim 7; line 49: Please delete "samples" and replace it with --sample--

Signed and Sealed this

Thirty-first Day of March, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,478,552 B2  
APPLICATION NO. : 11/385273  
DATED : January 20, 2009  
INVENTOR(S) : Gotthard et al.

Page 1 of 1

It is certified that error appears in the above-identified patent and that said Letters Patent is hereby corrected as shown below:

<u>Column 16</u>  
Claim 7; line 43: Please delete "robe" and replace it with --probe--  
Claim 7; line 49: Please delete "samples" and replace it with --sample--

This certificate supersedes the Certificate of Correction issued March 31, 2009.

Signed and Sealed this

Twenty-first Day of April, 2009

JOHN DOLL  
*Acting Director of the United States Patent and Trademark Office*